United States Patent
Porter et al.

(10) Patent No.: US 7,527,294 B2
(45) Date of Patent: May 5, 2009

(54) DECOUPLER DEFLECTOR DEVICES AND SYSTEMS FOR AUTOMOBILE STEERING SYSTEMS

(75) Inventors: Alan Porter, Canton, MI (US); Alvin Matti, Sterling Heights, MI (US); James Thornton, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 11/141,181

(22) Filed: May 31, 2005

(65) Prior Publication Data

US 2006/0267329 A1    Nov. 30, 2006

(51) Int. Cl.
    *B62D 1/011* (2006.01)
(52) U.S. Cl. .................. 280/777; 280/93.502; 74/492
(58) Field of Classification Search ............ 280/93.502, 280/777, 779; 180/274; 74/492
    See application file for complete search history.

(56) References Cited

U.S. PATENT DOCUMENTS

| 3,424,263 | A |   | 1/1969  | Black          |        |
|-----------|---|---|---------|----------------|--------|
| 3,472,093 | A | * | 10/1969 | Tenniswood     | 74/492 |
| 3,477,307 | A | * | 11/1969 | Maddox         | 74/492 |
| 3,760,649 | A | * | 9/1973  | Decouzon et al.| 74/492 |
| 3,926,069 | A | * | 12/1975 | Wenninger      | 74/492 |
| 3,934,896 | A |   | 1/1976  | Barenji        |        |
| 4,086,825 | A | * | 5/1978  | Badcock et al. | 74/492 |
| 4,133,220 | A | * | 1/1979  | Wenninger      | 74/492 |
| 4,156,372 | A | * | 5/1979  | Wenninger      | 74/492 |
| 4,411,167 | A | * | 10/1983 | Mohr           | 74/492 |
| 4,746,144 | A | * | 5/1988  | Kulczyk        | 280/777|
| 4,895,390 | A | * | 1/1990  | Fujikawa et al.| 280/777|
| 4,966,554 | A | * | 10/1990 | Tsukamoto      | 439/15 |
| 5,074,161 | A | * | 12/1991 | Hancock        | 74/492 |

(Continued)

FOREIGN PATENT DOCUMENTS

| EP | 0 014 219 A1 | 8/1980  |
|----|--------------|---------|
| GB | 2 250 518 A  | 8/1991  |
| JP | 6 263041     | 9/1994  |
| JP | 08337170 A   | 12/1996 |

OTHER PUBLICATIONS

Search Report for Application No. GB0609945.1 issued by the British Patent Office dated Jul. 14, 2006.
Examination Report for British Application No. GB0609945.1 dated Apr. 25, 2008.

*Primary Examiner*—John Q. Nguyen
*Assistant Examiner*—Timothy Wilhelm
(74) *Attorney, Agent, or Firm*—O'Brien Jones, PLLC

(57) ABSTRACT

Decoupler deflector devices and systems for automobile steering systems are provided. A decoupler deflector device in an automobile steering system can be connected to an upper intermediate shaft ("I-shaft") portion or an I-shaft joint. The decoupler device can be adapted to contact a lower I-shaft portion and rotate the upper I-shaft portion downwardly such that the upper I-shaft portion does not interfere with a collapsing steering column when subjected to loading from an automobile driver during a front-end collision impact event. The decoupler device can comprise a first end portion coupled to an upper I-shaft portion and an I-shaft joint; and a second end portion spaced apart from the first end portion to contact a lower I-shaft portion and rotate the upper I-shaft portion. Other embodiments are also claimed and described.

7 Claims, 6 Drawing Sheets

U.S. PATENT DOCUMENTS

| | | | |
|---|---|---|---|
| 5,248,214 A * | 9/1993 | Duffy et al. | 403/2 |
| 5,336,013 A * | 8/1994 | Duffy et al. | 403/2 |
| 5,380,040 A * | 1/1995 | Perichon et al. | 280/777 |
| 5,816,352 A * | 10/1998 | Hacker | 180/167 |
| 6,089,342 A * | 7/2000 | Muller et al. | 180/274 |
| 7,090,046 B2 * | 8/2006 | Nebuya et al. | 180/274 |

* cited by examiner

DECOUPLER DEFLECTOR DEVICES AND SYSTEMS FOR AUTOMOBILE STEERING SYSTEMS

TECHNICAL FIELD

The present invention relates generally to automobile steering systems, and more particularly, to safety devices for deflecting automobile steering intermediate shafts ("I-shafts") during a collision.

BACKGROUND

When an automobile is subjected to a front impact, the driver of the automobile will continue moving forward relative to the vehicle due to inertial forces. This forward movement can cause the driver to collide with a rearward moving automobile steering system thus potentially injuring the driver. Collapsible steering columns are safety devices that have been utilized to stop the automobiles driver's forward momentum and minimize driver injury. Collapsible steering columns typically slow the driver's movement by collapsing to absorb energy from the driver when impacted by the driver. So that steering columns collapse under loads from the driver, external forces or influences acting on the steering columns should be considered when designing collapsible steering columns.

I-shafts are one major component which can influence a steering column's ability to resist a collapse. I-shafts transfer steering inputs (e.g., steering wheel rotations) from the steering column to the steering gear in automobile steering systems. As such, I-shafts are generally coupled to the steering column and steering gear. During a front-end impact, the steering gear, and therefore the I-shaft, both usually move rearward towards the steering column and driver. The I-shaft rearward force directed toward the steering column needs to be minimized, eliminated, and/or controlled so the steering column can be allowed to collapse forward and effectively absorb energy from a forward moving automobile driver.

One method to affect the I-shaft forces on the steering column includes using an I-shaft decoupler. Typically, an I-shaft decoupler enables an I-shaft to separate into two parts when a predetermined rearward force is exerted on the I-shaft. Thus, decoupling the steering column from the I-shaft enables the steering wheel and steering column to move forward with a driver due to the inertial forces exerted on a driver during front impact events. In theory, although this decoupling would seem to limit the maximum load an I-shaft transfers to a steering column, such is not the case.

While current steering column and I-shaft decoupling systems reduce the rearward force exerted on a driver in a front impact, these systems have several drawbacks. Current decoupling systems do not adequately control the two separated parts of the I-shaft ensuring that they do not adversely affect collapse of the steering column. For example, after decoupling an I-shaft, a lower part of the I-shaft could continue to move rearward and strike the steering column. In addition, the upper part of the I-shaft could contact a surrounding component such as the dash panel, becoming lodged in the dash panel, and strike the brake pedal assembly while the column is trying to collapse due to loads from the driver. These adverse affects can cause harm to automobile drivers because the steering column is not enabled to fully collapse, thus exerting extreme rearward forces on an automobile driver during a front-end collision. Additional drawbacks associated with current steering column and I-shaft decoupling systems include that current systems do not utilize the rearward force of the I-shaft to assist in completely collapsing the steering column, and current systems have a tendency to exert forces on drivers that exceed the force limits established by federal motor vehicle safety standards.

SUMMARY

The various embodiments of the present invention provide decoupler deflector devices for automobile steering systems. Such systems enhance the safety measures for automobile drivers involved in front impact crash events while operating automobiles. The various embodiments of the present invention can be implemented in many vehicles, and enable the steering column to fully stroke after decoupling thus limiting the rearward force exerted on automobile drivers. In addition, the various embodiments of the invention can be used to direct or position I-shaft parts in various directions ensuring that the steering column fully strokes and collapses. Also, the various embodiments of the present invention decrease the amount of rearward force exerted on automobile drivers below limits established by federal motor vehicle safety guidelines during front impact crash events.

A decoupler deflector device in an automobile steering system according to some embodiments of the present invention can comprise a first end portion and a second end portion. The first end portion can be coupled to one of an upper I-shaft portion and an I-shaft joint, and a second end portion, spaced apart from the first end portion, can contact a lower I-shaft portion and rotate the upper I-shaft portion.

A steering column system for fully stroking a steering column with a deflector device in accordance with another embodiment of the present invention can comprise a steering column, an I-shaft decoupler connecting a lower I-shaft portion and an upper I-shaft portion, an I-shaft joint hingedly coupling the upper I-shaft portion to the steering column, and a deflector device. The deflector device can have a first end and a second end, and the first end can be coupled to at least one of the upper I-shaft portion and the I-shaft joint. The second end can be positioned to contact at least a part of the I-shaft decoupler and rotate the upper I-shaft portion such that the steering column fully strokes.

A method to deflect an I-shaft in accordance with yet another embodiment of the present invention can generally comprise providing a decoupler deflector, and positioning the decoupler deflector to strike at least a portion of an I-shaft such that at least a first portion of the I-shaft rotates in a predetermined rotational direction so that the steering column fully strokes.

These and other features, as well as advantages, which characterize the various preferred embodiments of present invention, will be apparent from a reading of the following detailed description and a review of the associated drawings.

DETAILED DESCRIPTION OF PREFERRED EMBODIMENTS

Figure 1:
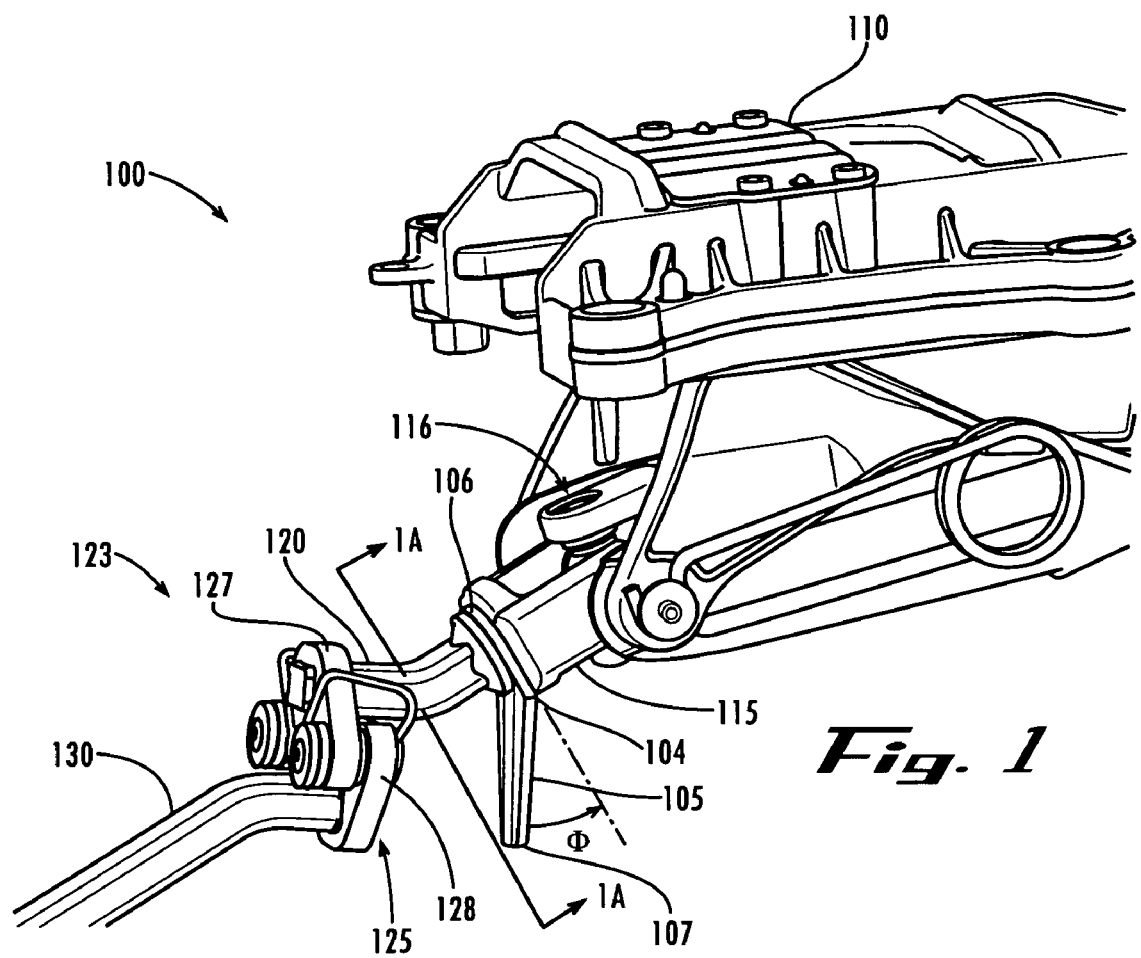
FIG. 1 illustrates an automobile steering column system having a decoupler deflector in accordance with some embodiments of the present invention.

Referring now to the drawings, in which like numerals represent like elements, various embodiments of the present invention are herein described.

FIG. 1 illustrates an automobile steering system 100 having a decoupler deflector 105 in accordance with some embodiments of the present invention. As shown the steering system 100 generally includes the decoupler deflector 105, a steering column 110, an I-shaft joint 115, and an I-shaft 123. As shown, the I-shaft 123 has an upper I-shaft portion 120 coupled to a lower I-shaft portion 130 with an I-shaft decoupler 125. The decoupler deflector 105 can be utilized with many automobile types to enable the steering column 110 to fully stroke when the I-shaft decoupler 125 separates the upper I-shaft portion 120 of the I-shaft 123 from the lower I-shaft portion 130. When subjected to a front-end collision force, the I-shaft 123 is preferably adapted to separate at the I-shaft decoupler 125 so that the upper I-shaft portion 120 separates or breaks away from the lower I-shaft portion 130. The I-shaft decoupler 125 is preferably adapted to separate into an upper part 127 and a lower part 128 during a front-end collision. This separation helps prevent force transfer from the I-shaft 123 to the steering column 110, and allows the steering column 110 to stroke forward absorbing energy exerted upon it by an automobile driver colliding with a steering wheel and/or air bag, forming a part of the steering column 110 assembly.

As shown in FIG. 1, the I-shaft 123 is in a normal operating position. The I-shaft 123 is used to transmit steering signals, such as steering torque and rotational angle, from the steering column 110 to steering gear (not shown) in an automobile during normal operation. The I-shaft 123 can generally include the upper I-shaft portion 120, the I-shaft decoupler 125, and the lower I-shaft portion 130. The I-shaft 123 is typically coupled to the steering column 110 by the I-shaft joint 115. Preferably, the I-shaft joint 115 is an I-shaft U-joint known to those ordinarily skilled in art. In addition, the I-shaft joint 115 is preferably adapted to rotate or flex about the steering column 110 at an axis, such as the U-joint pivot axis 116. The I-shaft joint 115 connects the I-shaft 123 to the steering column 110 and allows the I-shaft to rotate.

The decoupler deflector 105, as shown in FIG. 1, extends downwardly from the upper I-shaft portion 120 and the I-shaft joint 115. The decoupler deflector 105 has a first end portion 106 attached to the I-shaft 123 between the I-shaft joint 115 and the upper I-shaft portion 120, and a second end portion 107 extending below the I-shaft 123. The decoupler deflector 105 is preferably disposed between the upper I-shaft portion 120 and the I-shaft joint 115. Alternatively, the decoupler deflector 105 can be coupled to the I-shaft joint 115, the upper I-shaft portion 120, or the lower I-shaft portion 130 without departing from the scope of the invention. The decoupling deflector 105 remains attached to the I-shaft joint 115 enabling the decoupling deflector 105 to deflect the upper I-shaft portion 120 away from a dash panel in an automobile.

In one embodiment of the present invention, the second end portion 107 is offset from the first end portion 106 by a predetermined angle Φ at an angular bend 104. Typically the predetermined angle Φ is between approximately 60 degrees and −60 degrees. Depending upon the exact implementation, the angle Φ and the length of the decoupler deflector can vary. The angular bend 104 is located between the first end portion 106 and the second end portion 107 of the decoupler deflector 105. In other embodiments, the angular bend 104 can be located in other places along the length of the decoupler deflector 105. The angular bend 104 can be used to place the second end portion 107 in a closer relationship to the lower I-shaft portion 130 than the first end portion 106 thus allowing the decoupler deflector 105 to strike the I-shaft decoupler 125 earlier than if the decoupler deflector 105 did not have the angular bend 104. As shown, the bend 104 also decreases the distance between the first end 106 and the second end 107 of the decoupler deflector 105 than if the decoupler deflector 104 did not have the angular bend 104.

The decoupler deflector 105 is preferably positioned to strike or contact the I-shaft decoupler lower part 128 and the I-shaft lower portion 130 during front-end impact. The collision between the decoupler deflector 105, and the I-shaft decoupler lower part 128 and the I-shaft lower portion 130 directs or deflects the I-shaft upper portion 120 in a downward direction. Preferably the decoupler deflector 105 is positioned such that when the second end portion 107 of the decoupler deflector 105 contacts the I-shaft decoupler lower part 128, the I-shaft upper portion 120 will rotatably pivot about the U-joint pivot axis 116 in a downwardly direction. In other embodiments of the present invention, the decoupler deflector 105 may be positioned in other orientations to direct the upper I-shaft portion 120 in other directions. The various orientations of the decoupler deflector 105 are discussed in greater detail with reference to FIG. 2.

Figure 2:
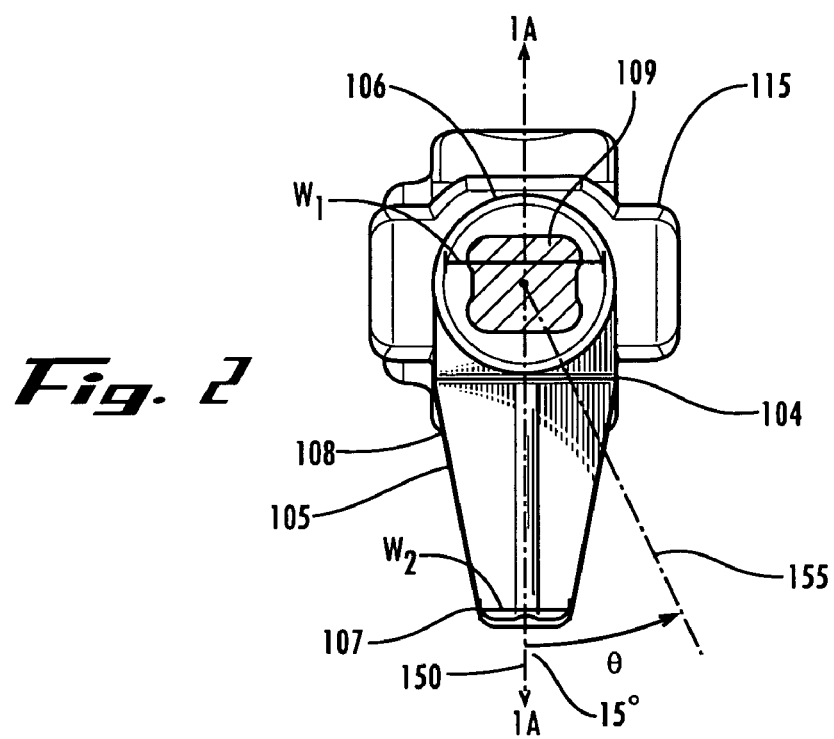
FIG. 2 illustrates a front-close-up view of the decoupler deflector along line 1A illustrated in FIG. 1 in accordance with some embodiments of the present invention.

FIG. 2 illustrates a front-close-up view of the decoupler deflector 105 illustrated in FIG. 1 taken at the 1A-1A line. The decoupler deflector 105 preferably has the first end portion 106, the second end 107 portion, and a body section 108 disposed between the first and second end portions 106, 107. The first end portion 106 preferably defines an aperture 109 for mounting the decoupler deflector 105 between the I-shaft joint 115 and the I-shaft upper portion 120.

The decoupler deflector 105 is orientated such that a centerline of the decoupler deflector 105 is located substantially vertically to correspond with a vertical axis 150 of the I-shaft joint 115. In other embodiments, the decoupler deflector 105 can be orientated such that the centerline 150 of the decoupler deflector forms an angle between the vertical axis 150 of the I-shaft joint 115. For example, the centerline of the decoupler deflector 105 may be positioned similar to dashed line 155 to form an angle θ relative to the vertical axis 150 of the I-shaft joint 115. It will be understood that the angle θ can have any value in accordance with the various embodiments of the present invention so long as the decoupler deflector 105 is configured and positioned to contact the I-shaft decoupler lower part 128.

Orientating the centerline of the decoupler deflector 105 at various orientation angles θ with respect to the vertical axis 150 of the I-shaft joint 115 enables the decoupler deflector 105 to rotate the I-shaft upper portion 120 in a direction corresponding to the orientation angle θ. For example, if θ equals approximately 90 (or 270) degrees, the I-shaft upper portion 120 could rotate along a horizontal plane when the decoupler deflector 105 strikes the I-shaft decoupler 125. It will be understood that many other orientation angles θ can be used in accordance with the various embodiments of the present invention enabling the I-shaft upper portion 120 to rotate or move in a direction corresponding to an orientation angle θ.

The decoupler deflector 105 can have many shapes, sizes, and orientations, and be made of various materials. In addition, the decoupler deflector 105 can be mounted on the upper 127 or lower 128 parts of the I-shaft decoupler 125. Preferably, however, the decoupler deflector 105 and the I-shaft decoupler 125 are configured so that the decoupler deflector 105 will contact at least one of the upper 127 or lower 128 parts of the I-shaft decoupler 125 after decoupling to control movement and direction of the upper and lower portions 120, 130 of the I-shaft 123.

In some embodiments, the decoupler deflector 105 can also have a width that varies across its length. For example, the decoupler deflector 105 can have a first width $W_1$ proximate the first end 106 and a second width $W_2$ proximate the second end portion 107. Preferably, the first width $W_1$ at the first end portion 106 is greater than the second width $W_2$ at the second end portion 107. For example, the first width $W_1$ can be approximately 25 millimeters, and the second width $W_2$ can be approximately 13 millimeters. In addition, the decoupler deflector 105 preferably has a length in the range of approximately 40 to 50 millimeters and a thickness of approximately three millimeters. Other dimensions are possible, but the inventors have discovered that these dimensions provide a decoupler deflector 105 that is small yet strong enough to withstand the forces experienced during a collision.

Figure 3:
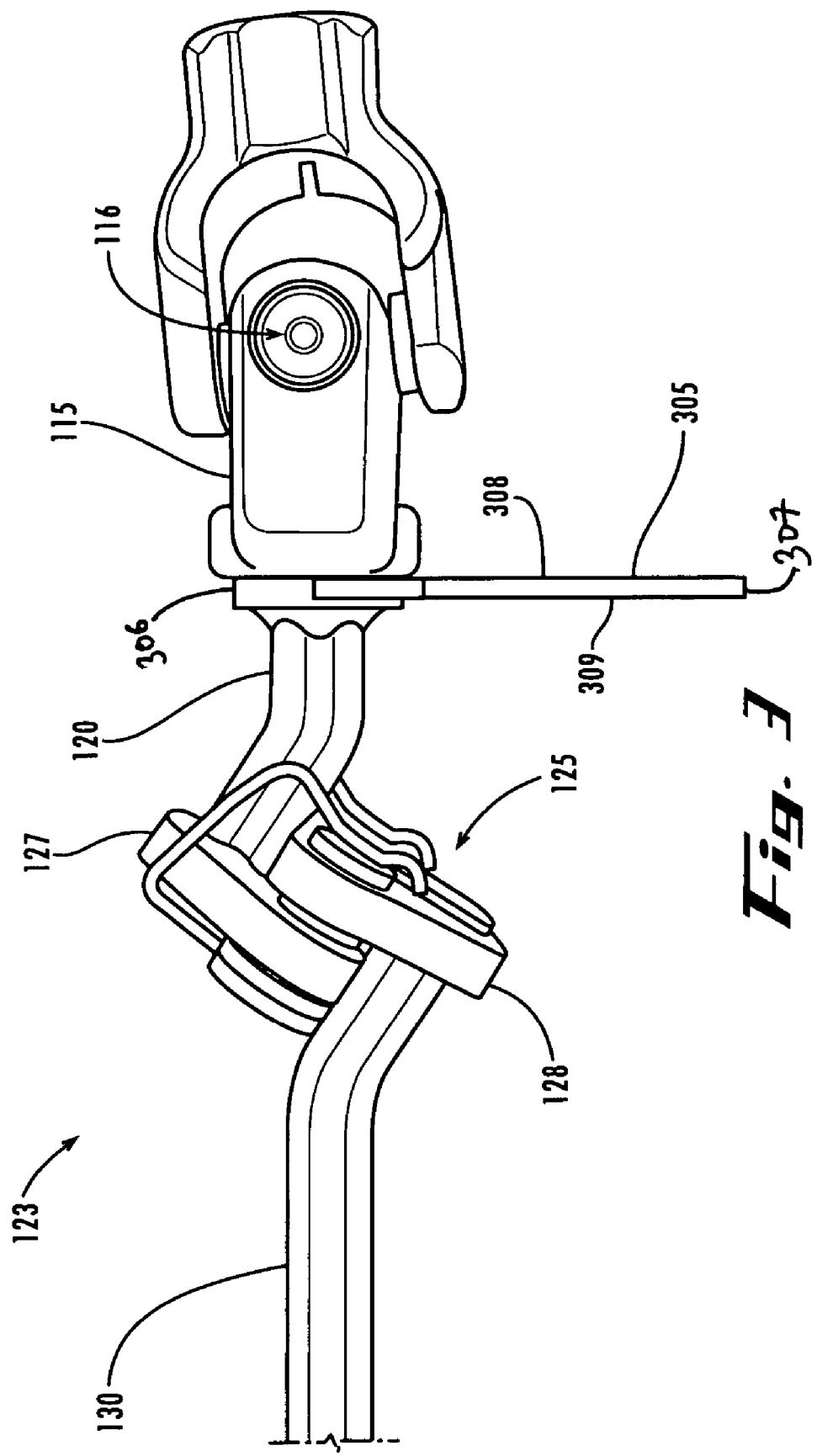
FIG. 3 illustrates another embodiment of a steering column decoupler deflector coupled to an I-shaft in accordance with some embodiments of the present invention.

FIG. 3 illustrates another embodiment of a steering column decoupler deflector 305 coupled to an I-shaft 123 in accordance with some embodiments of the present invention. The decoupler deflector 305 includes a first end portion 306 and a second end portion 307. The first end portion 306 is orientated coplanar to the second end portion 307 and therefore the decoupler deflector 305 does not have an angular bend 104. The decoupler deflector 305 also includes a body portion 308 between the first end and second portions 306, 307. As shown in FIG. 3, the body portion 308 has a front edge 309 that is substantially liner providing a linear region. In addition, the decoupler deflector 305 is positioned substantially perpendicular to the upper I-shaft portion 120 and the I-shaft joint 115.

The decoupler deflector 305 (and the other decoupler deflectors in accordance with the present invention) can be made of various materials using different manufacturing processes. Preferably, the decoupler deflectors according to the present invention are manufactured from steel utilizing a stamping process. Alternatively, the decoupler deflectors according to the present invention can be made of aluminum, titanium, cast iron, plastic (e.g. thermoplastic polymer), and many other materials capable of withstanding the impact force exerted on the decoupler deflector during a front-end collision. In addition, the decoupler deflector can be fabricated using forging, casting, or molding fabrication techniques.

Figure 4:
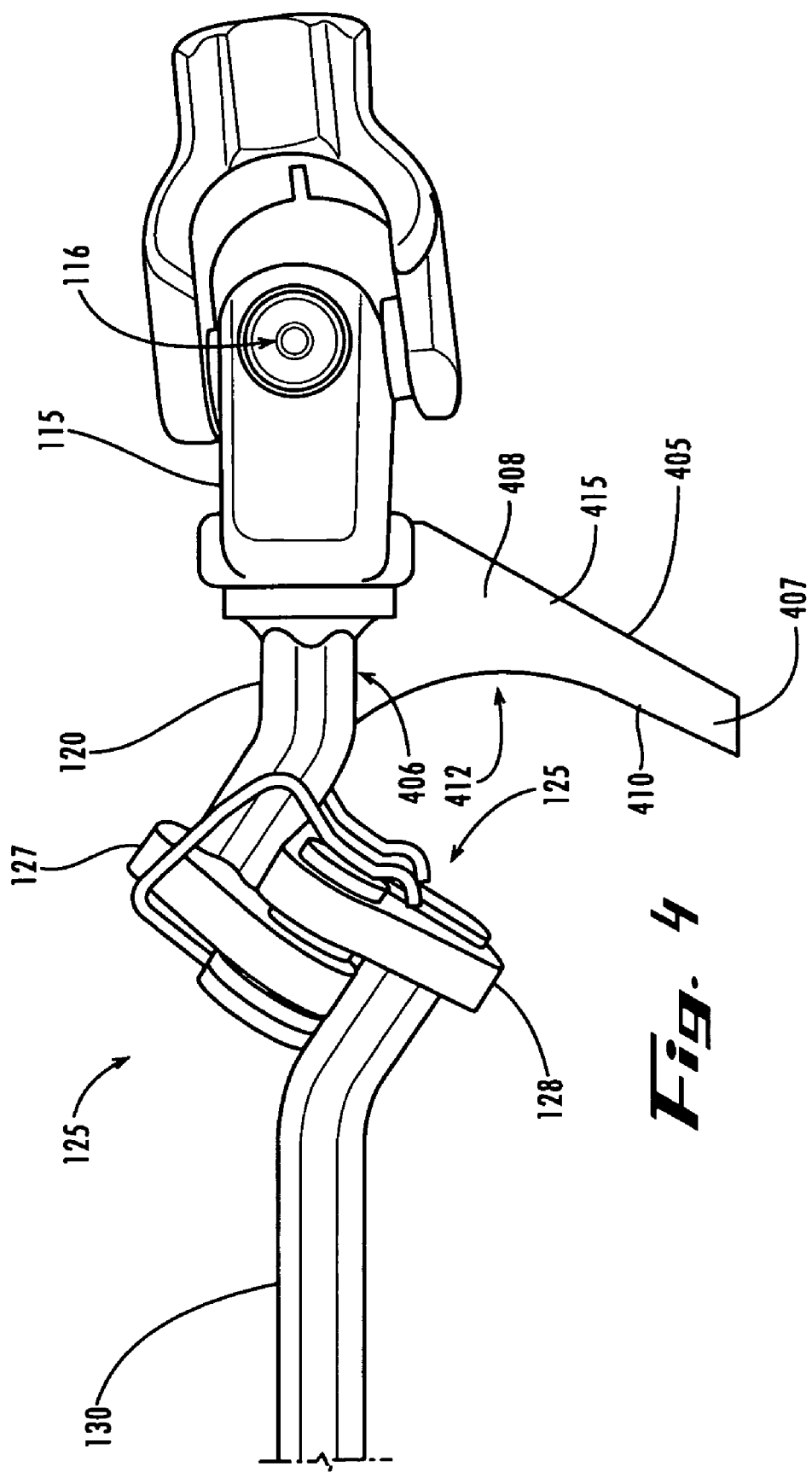
FIG. 4 illustrates another embodiment of a steering column decoupler deflector coupled to an I-shaft in accordance with some embodiments of the present invention.

FIG. 4 illustrates another embodiment of a steering column decoupler deflector 405 in accordance with some embodiments of the present invention. As shown, the decoupler deflector 405 is coupled to the I-shaft joint 115 and the upper I-shaft portion 120. The decoupler deflector 405 also has a first end portion 406 and a second end portion 407. The first end portion 406 is coupled to the I-shaft joint 115 and the upper I-shaft portion 120, and the second end portion 407 is spaced apart from the first end 406 forming a body portion 408 of the decoupler deflector 405. In addition, the decoupler deflector 405 has a front edge 410 and a rear edge 415. The front edge defines a curved region 412 disposed between the first end 406 and the second end 407. The curved region 412 and the first end 406 being coupled to the I-shaft joint 115 and the upper I-shaft portion 120 can enable the decoupler deflector to withstand and disperse impact forces throughout the decoupler deflector 405.

Figure 5A:
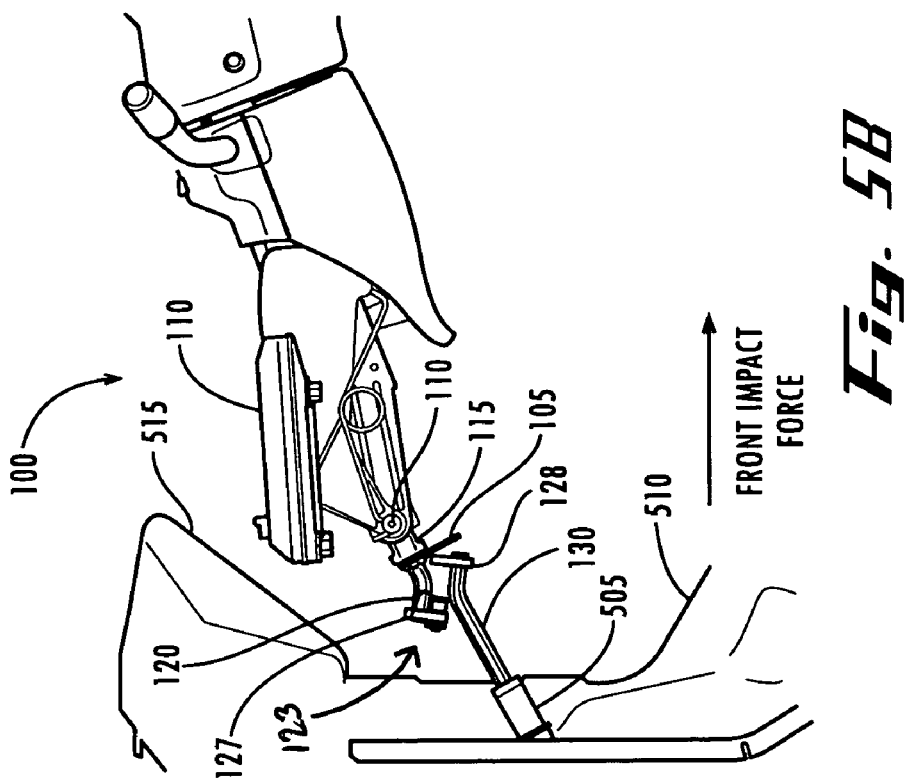
FIGS. 5A-5D (collectively FIG. 5) illustrate a series of events during a front-end collision crash and a decoupler deflector deflecting upper and lower portions of an I-shaft in accordance with some embodiments of the present invention.

FIGS. 5A-5D (collectively FIG. 5) illustrate a series of events during a front-end collision crash and a decoupler deflector 105 deflecting the upper 120 and lower portions 130 of the I-shaft 123 in accordance with some embodiments of the present invention. FIG. 5A illustrates the nominal position of the components in the steering system 100. As shown, the I-shaft 123 extends from a lower shaft 505, and the lower shaft 505 extends from a dash panel 510. Those skilled in the art will understand that the dash panel 510 separates the front passenger area of an automobile from an automobile engine compartment. In addition, a dash cowl 515 extends toward the steering column 110 creating a gap (or cavity) 520 between the dash cowl 515 and the lower I-shaft portion 130.

As shown in FIG. 5A, a horizontal plane H bisects the I-shaft decoupler 125 such that approximately half of the I-shaft decoupler 125 lies above the horizontal plane H and approximately half of the I-shaft decoupler 125 lies below the horizontal plane H. In conventional decoupling steering systems, the I-shaft decoupler upper part 127, when separated from the I-shaft decoupler lower part 128 due to a front-end collision, tends to move forward toward the dash panel 510 along the horizontal plane H due to inertial forces. As used herein, forward movement means that items are moving toward the front of an automobile, and rearward movement means that items are moving toward the rear of an automobile. Due to the extension of the upper I-shaft portion 120 and the forces generated during a front-end collision, the upper I-shaft decoupler part 127 becomes lodged in the dash panel 510. This lodging prevents the steering column 110 from fully stroking, or completely collapsing, in the gap 520 between the lower I-shaft portion 130 and the dash cowl 515. The lodging of the upper I-shaft decoupler part 127 creates hazardous conditions for an automobile driver striking a steering wheel attached to the steering column 110 because the forces experienced during a front-end collision transfer rearward to the driver. Essentially, when the upper I-shaft portion 120 lodges in the dash panel 510, the steering column 110 does not absorb forces exerted on it by the driver during a front-end collision because the steering column 110 stops moving.

Figure 5B:
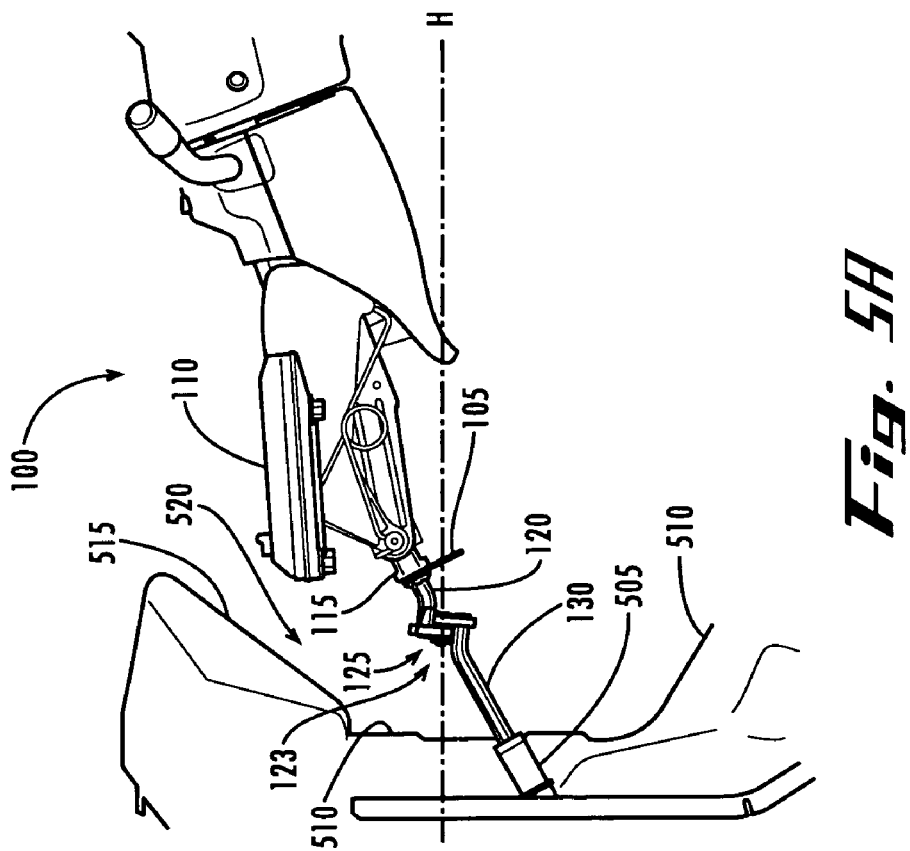

FIG. 5B illustrates the steering system 100 just after an automobile is subjected to a front-end collision. Typically, one of the first things that occurs after a front-end collision is that the I-shaft 123, dash panel 510, and dash cowl 515 move rearward toward the driver of the automobile in the direction of the front impact force arrow shown in FIG. 5B. The rearward movement of the I-shaft 123 causes the I-shaft decoupler 125 to separate such that the upper I-shaft portion 120 separates from the lower I-shaft portion 130. The I-shaft decoupler 125 also decouples into two parts: the upper part 127 and the lower part 128. The upper part 127 of the I-shaft decoupler 125 is attached to the upper I-shaft portion 120, and the lower part 128 of the I-shaft decoupler 125 is attached to the lower I-shaft portion 130.

Figure 5C:
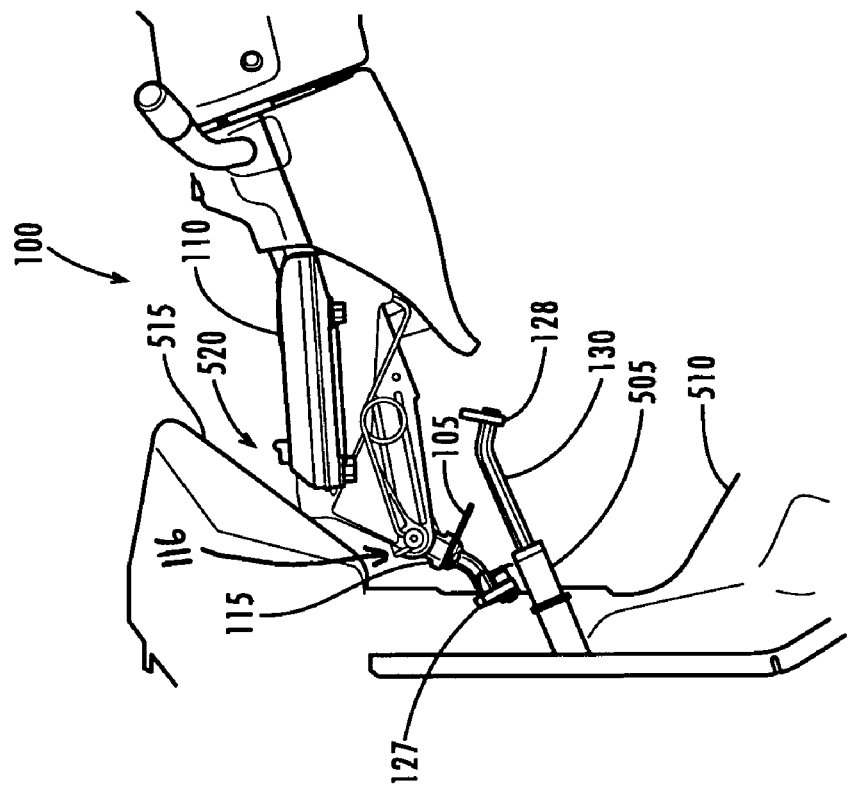

When the I-shaft decoupler 125 separates, the lower I-shaft portion 130 continues to move rearward toward the automobile driver. As the lower I-shaft portion 130 and the lower part 128 of the I-shaft decoupler 125 continue to move rearward, the lower part 128 of the I-shaft decoupler 125 strikes the decoupler deflector 105. The contact between the decoupler deflector 105 and the lower part 128 of the I-shaft decoupler 125 causes the upper part 127 of the I-shaft decoupler 125 and the upper I-shaft portion 120 to rotate downward away from the dash panel 510, as shown in FIG. 5C. As discussed above, the coupling between the I-shaft U-joint pivot axis 116 and the steering column enables the upper I-shaft portion 120 to rotate downward toward the lower I-shaft portion 130.

FIG. 5C illustrates the steering system 100 after the decoupler deflector 105 collides with the lower part 128 of the I-shaft decoupler 125. As shown, the upper part 127 of the I-shaft decoupler 125 and the upper I-shaft portion 120 rotates toward the lower portion 130 of the I-shaft 123. The rotation of the upper part 127 of the I-shaft decoupler 125 and the upper I-shaft portion 120 is caused by the contact between the decoupler deflector 105 and the lower part 128 of the I-shaft decoupler 125. As time progresses, the lower I-shaft portion 130 continues to move rearward and contacts the decoupler deflector 105. The decoupler deflector 105 in contact with the lower part 127 of the I-shaft decoupler 125 imparts a force moment on the I-shaft joint 115 about the U-joint pivot axis 116, and rotates the upper I-shaft portion 120 downward toward the lower I-shaft portion 130. The downward rotation of the upper I-shaft portion 120 enables the upper I-shaft portion 120 to move into the gap 520 between the lower I-shaft portion 130 the dash cowl 515, and prevents the upper I-shaft portion 120 from becoming lodged in the dash panel 510. The downward rotation of the upper I-shaft portion 120 and the upper part 127 of the I-shaft decoupler 125 can also impart a downward force on and move the lower part 128 of the I-shaft decoupler 125 and the lower I-shaft portion 130 parts 128 and 130 away from the steering column 110.

Figure 5D:
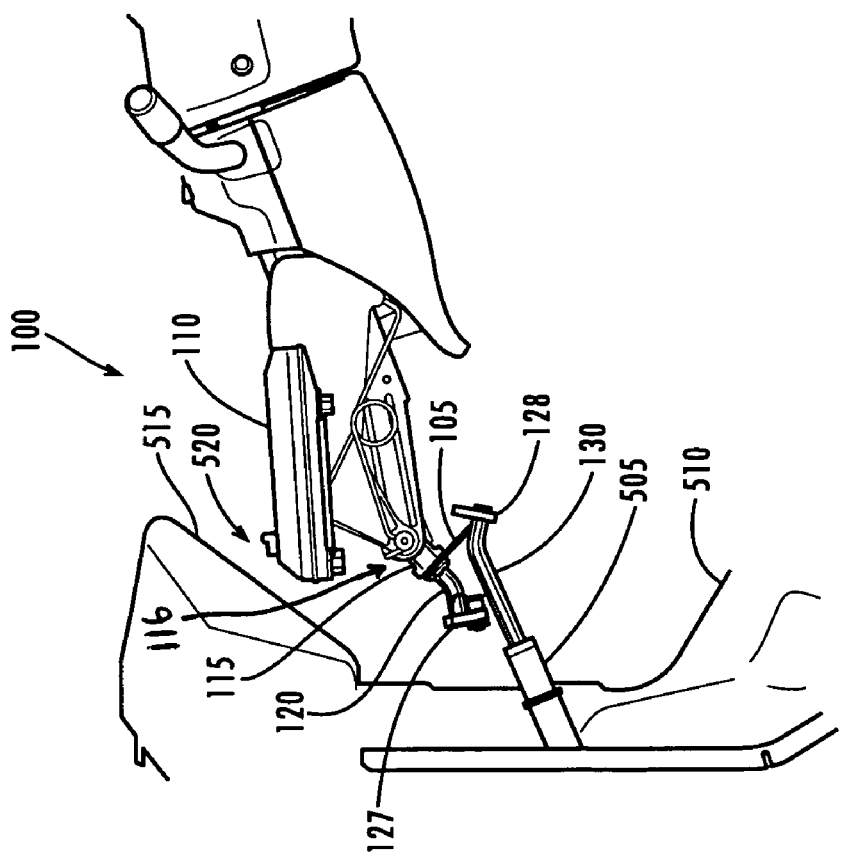

As shown in FIG. 5D, with the upper part 127 of the I-shaft decoupler 125 and the upper I-shaft portion 120 rotated into the gap 520 between the lower I-shaft portion 130 and the dash cowl 515, the steering column 110 fully strokes by completely collapsing in the gap 520 between the lower I-shaft portion 130 and the dash cowl 515. Preferably, the steering column 110 completely collapses under a load applied by the driver to absorb energy from the driver. Due to the contact between the decoupler deflector 105 and the lower part 128 of the I-shaft decoupler 125 and the lower I-shaft portion 130, the upper part 127 of the I-shaft decoupler does not lodge into the dash panel 510, thus enabling the steering column 110 to fully stroke.

Figure 6:
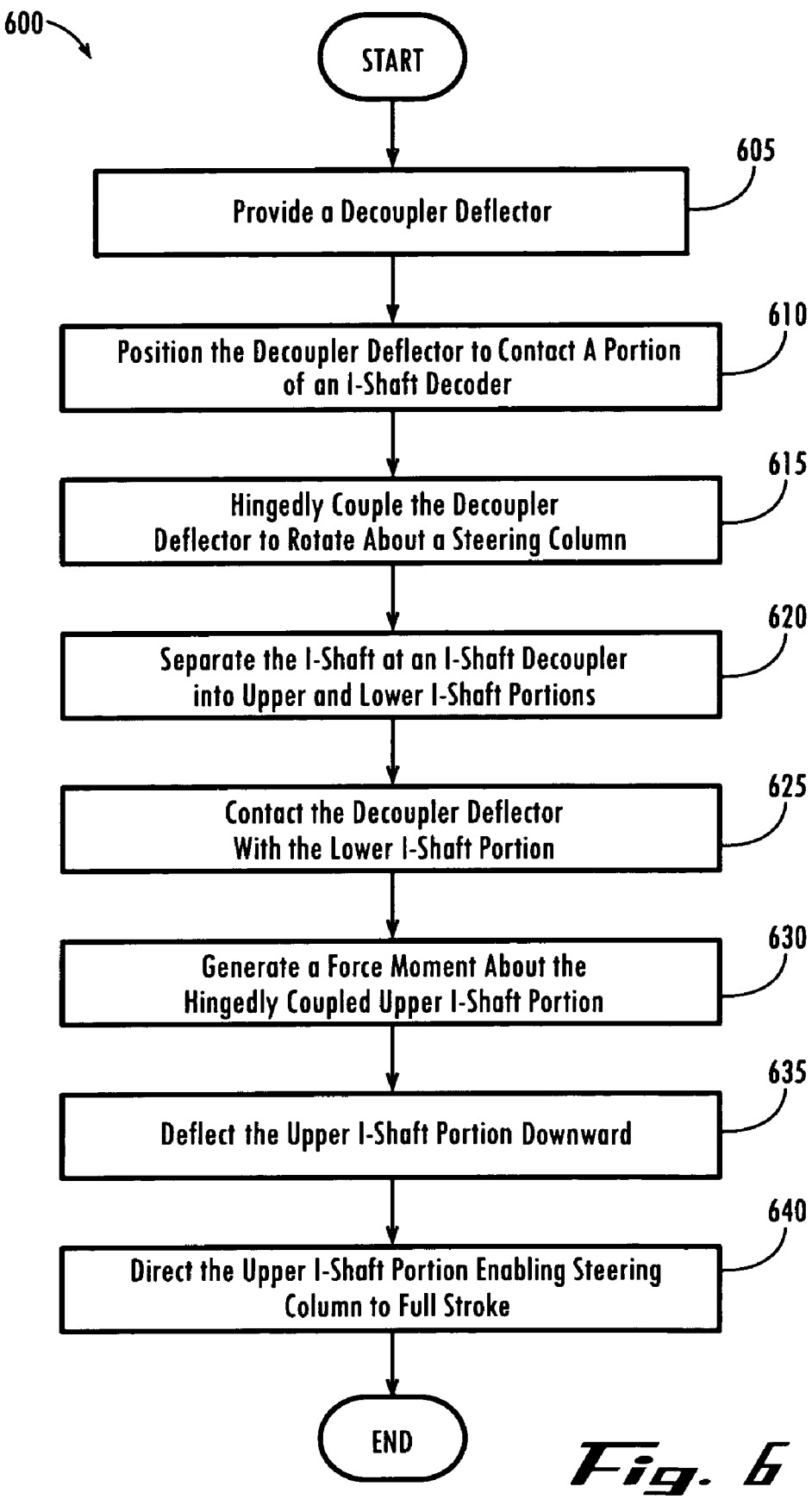
FIG. 6 illustrates a logical flow diagram of a method to deflect upper and lower portions of an I-shaft in accordance with some embodiments of the present invention.

FIG. 6 illustrates a logical flow diagram of a method 600 to deflect an I-shaft 123 in accordance with some embodiments of the present invention. The method 600 is only one method according to some of the embodiments of the present invention. Accordingly, those skilled in the art will understand that other methods are contemplated by the various embodiments of the present invention, and that method 600 can be performed in various orders.

At 605, a decoupler deflector 105 is provided. The decoupler deflector 105 can be coupled to a steering column system 100, and in particular an I-shaft 123 of a steering column system 100. Next at 610, the decoupler deflector 105 can be positioned to contact at least a portion of an I-shaft decoupler 125 such that a first portion 120 of the I-shaft 123 rotates in a predetermined rotational direction enabling the steering column 110 to fully stroke. For example, the decoupler deflector 105 can be positioned such that the upper portion 120 of the I-shaft 123 rotates toward the lower portion 130 of the I-shaft 123. In other embodiments, the decoupler deflector 105 can be positioned or angled to deflect the I-shaft portions 120, 130 in other directions. For example, the I-shaft upper portion 120 can be directed laterally in some embodiments of the present invention.

The method 600 can further comprise hingedly coupling the decoupler deflector 105 to the steering column 110 so that the decoupler deflector 105 rotates about the U-joint pivot axis 116 at 615. In an exemplary embodiment, the decoupler deflector 105 can be coupled to the upper portion 120 of the I-shaft 123 that is coupled to an I-shaft U-joint 115, and the I-shaft U-joint 115 can be connected to the steering column 110 so that force exerted on the decoupler deflector 105 causes the I-shaft upper portion 120 to rotate about the steering column 110 at the U-joint pivot axis 116. In addition, the method 600 can further comprise separating the I-shaft 123 into an upper portion 120 and a lower portion 130 at 620. The separation of the I-shaft 123 can occur at an I-shaft decoupler 125 adapted to separate into upper and lower portions 127, 128 when experiencing a front-end collision impact force.

The method 600 can also comprise contacting the decoupling deflector 105 with the lower portion 130 of the I-shaft 123 at 625. Contact between the decoupling deflector 105 and the lower portion 130 of the I-shaft 123 can generate a force moment on the upper portion 120 of the I-shaft 123 that is rotatably coupled to the steering column at the U-joint pivot axis 116 at 630. The force moment imparted on the rotating upper portion 120 of the I-shaft 123 can move the upper portion 120 downwardly such that the upper portion 120 of the I-shaft 123 does not become lodged in the dash panel 510. The contact between the decoupling deflector 105 and the lower portion 130 of the I-shaft 123 can also deflect the upper portion 120 of the I-shaft 123 downward at 635 and direct the steering column 110 into a gap 520 defined by a dash cowl 515 and a lower shaft 505 of a steering column system 100. In addition, at 640 the upper I-shaft portion 127 can be directed downward enabling the steering column 110 to fully stroke in the gap 520. In an exemplary embodiment of the present invention, the steering column 110 is enabled to stroke approximately 100 millimeters in the gap 520 to absorb energy from an automobile driver during a front-end crash.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

We claim:

1. A decoupler deflector device for an automobile steering system comprising an upper I-shaft portion and a lower I-shaft portion connected by an I-shaft decoupler, the decoupler deflector device comprising:
   a first portion coupled between the upper I-shaft portion and an I-shaft joint; and
   a second portion extending from a proximal end adjacent to the first portion to a distal end spaced from the proximal end in a direction away from the upper I-shaft portion, the second portion having a length defined by a distance from its proximal end to its distal end, the second portion being configured to contact the lower I-shaft portion and rotate the upper I-shaft portion upon decoupling of the I-shaft,
   wherein the second portion of the decoupler deflector device is curved along its length.

2. The device of claim 1, wherein the second portion is adapted to rotate the upper I-shaft portion toward the lower I-shaft portion upon contacting the lower I-shaft portion.

3. The device of claim 1, wherein a width of the second portion tapers to a distal end as it extends from the first portion.

4. A steering column system comprising:
an upper I-shaft portion and a lower I-shaft portion;
an I-shaft decoupler connecting the upper I-shaft portion and the lower I-shaft portion; and
a deflector device comprising:
- a first portion coupled between the upper I-shaft portion and an I-shaft joint and having a length, a width, and a thickness, the thickness extending in a direction from the upper I-shaft portion to the I-shaft joint; and
- a second portion extending from a proximal end adjacent to the first portion to a distal end spaced from the proximal end in a direction away from the upper I-shaft portion, and having a length defined by a distance between the proximal end and the distal end, a width, and a thickness that is less than the width, the second portion being configured to contact the lower I-shaft portion and rotate the upper I-shaft portion upon decoupling of the I-shaft, wherein a plane extending along the length and width of the second portion is offset from a plane extending along the length and the width of the first portion.

5. The system of claim 4, wherein the distal end of the second portion strikes a portion of the I-shaft decoupler upon decoupling of the I-shaft.

6. The system of claim 4, wherein the deflector device is orientated at a predetermined orientation and the upper I-shaft portion rotates in a direction corresponding to the predetermined orientation of the deflector device upon decoupling of the I-shaft.

7. A method for deflecting a portion of a steering column I-shaft upon decoupling of the I-shaft, the I-shaft comprising a lower I-shaft portion and an upper I-shaft portion having a transverse axis and an outer perimeter spaced outwardly from the transverse axis, the method comprising:
mounting a deflector between the upper I-shaft portion and an I-shaft joint, the defector comprising:
a first portion configured to be mounted between the upper I-shaft portion and the I-shaft joint; and
a second portion extending from a proximal end adjacent to the first portion to a distal end spaced from the proximal end in a direction away from the upper I-shaft portion, the second portion having a length defined by a distance between the distal end and the proximal end; and
positioning the deflector so that the second portion of the deflector extends along its length outwardly beyond the outer perimeter of the upper I-shaft portion, and so that, upon decoupling of the I-shaft, the lower I-shaft portion will contact the deflector and rotate the upper I-shaft portion in a predetermined rotation direction.

* * * * *